United States Patent
Pauser et al.

[11] Patent Number: 6,149,168
[45] Date of Patent: Nov. 21, 2000

[54] WHEELED TOOL CASE

[75] Inventors: Herbert Bernhard Pauser, Darmstadt; Martin Topel, Frankfurt am Main, both of Germany

[73] Assignee: Parat-Werk Schonenbach GmbH & Co. KG, Remscheid, Germany

[21] Appl. No.: 09/232,872

[22] Filed: Jan. 15, 1999

[30] Foreign Application Priority Data

Jan. 16, 1998 [DE] Germany ........................ 298 00 665 U
Sep. 28, 1998 [DE] Germany ............................ 198 44 372

[51] Int. Cl.$^7$ ..................................................... B62B 3/02
[52] U.S. Cl. .................. 280/47.371; 280/47.41; 280/43.1; 280/43.14
[58] Field of Search ............................ 280/47.23, 47.34, 280/47.35, 47.371, 47.16, 47.18, 47.19, 47.2, 47.26, 47.27, 47.28, 47.315, 655, 655.1, 638, 641, 645, 42, 651, 652, 654, 47.13, 47.17, 47.24, 37; 190/117, 107, 21, 22, 34, 37

[56] References Cited

U.S. PATENT DOCUMENTS

| | | | |
|---|---|---|---|
| 4,062,565 | 12/1977 | Holtz | 280/65 |
| 4,258,962 | 3/1981 | Slaugh | 280/79.2 |
| 4,913,453 | 4/1990 | Wagner et al. | 280/79.2 |
| 5,002,293 | 3/1991 | Gottselig | 280/47.35 |
| 5,074,571 | 12/1991 | Reese | 280/47.19 |
| 5,374,073 | 12/1994 | Hung-Hsin | 280/30 |
| 5,380,023 | 1/1995 | McBee | 280/87.01 |
| 5,590,897 | 1/1997 | Tsai | 280/655 |
| 5,653,319 | 8/1997 | Wang | 190/115 |
| 5,730,264 | 3/1998 | Lu | 190/108 |
| 5,927,833 | 7/1999 | Kelley | 312/196 |
| 5,951,037 | 9/1999 | Hsieh et al. | 280/655 |

Primary Examiner—Brian L. Johnson
Assistant Examiner—Tony Winner
Attorney, Agent, or Firm—Herbert Dubno; Andrew Wilford

[57] ABSTRACT

A carrier for tools and the like has a base normally adapted to sit on a floor surface, a frame extending upward from the base, and a hollow case adapted to hold the tools and having bottom, top, and side walls displaceable on the frame between a lower position sitting on the base and an upper position on the frame spaced above the base. This frame includes at least one generally vertical post and the case is vertically slidable along the post. A latch or the like is provided for retaining the case in the upper position on the post. The latch includes a spring-loaded latch that automatically secures the case in the upper position when it is slid into the upper position. In addition the frame includes two such posts parallel to each other and the upper wall is provided generally centrally with a handle. Each post includes an upper tube and a lower tube telescoping therewith. The lower tubes are fixed in the base and each post projects through the lower wall and through the upper wall of the case. Normally the base is provided with floor-engaging wheels, typically two of them at a rear edge of the base. In addition the frame includes a crosspiece connecting upper ends of the upper tubes.

32 Claims, 15 Drawing Sheets

WHEELED TOOL CASE

FIELD OF THE INVENTION

The present invention relates to a tool or instrument carrier or case. More particularly this invention concerns a wheeled case suitable for storage and transport of tools and the like.

BACKGROUND OF THE INVENTION

A repair person frequently has to transport a considerable quantity of tools and instruments from place to place. If the amount of equipment needed is small it can simply be placed in a fitted tool case that is set down and opened at the job site for access to the tools and instruments inside. When the quantity of equipment becomes more considerable, the tool case is typically transported in a luggage cart or dolly that can be rolled. Once at the job site, the case is separated from the cart, raised, and set on a desk or table so that it can be opened to give access to the tools.

Tool cases are also known that are provided with wheels. Such a system is good in a shop or where limited movement is necessary, but cannot normally be actually taken on the road.

OBJECTS OF THE INVENTION

It is an object of the present invention to provide an improved portable tool or instrument case.

Another object is the provision of such an improved portable tool or instrument case which overcomes the above-given disadvantages, that is which is simple, which allows the tools or instruments to be transported easily, which gives good access to the tools or instruments once the job site is reached.

SUMMARY OF THE INVENTION

A carrier for tools and the like has according to the invention a base normally adapted to sit on a floor surface, a frame extending upward from the base, and a hollow case adapted to hold the tools and having bottom, top, and side walls displaceable on the frame between a lower position sitting on the base and an upper position on the frame spaced above the base. This frame includes at least one generally vertical post and the case is vertically slidable along the post. A latch or the like is provided for retaining the case in the upper position on the post.

Thus with this arrangement it is possible to move the case which actually holds the tools, parts, or other supplies into an upper position which can readily be accessed by a standing or sitting person. Of course if the user is working on the floor, the case can be left in the lower position.

In accordance with the invention the retainer includes a spring-loaded latch that automatically secures the case in the upper position when it is slid into the upper position. In addition the frame includes two such posts parallel to each other and the upper wall is provided generally centrally with a handle. Each post includes an upper tube and a lower tube telescoping therewith. The lower tubes are fixed in the base and each post projects through the lower wall and through the upper wall of the case. Normally the base is provided with floor-engaging wheels, typically two of them at a rear edge of the base. In addition the frame includes a crosspiece connecting upper ends of the upper tubes.

The crosspiece and upper tubes according to the invention are movable relative to the case in the upper position thereof. For ease of handling the handle is formed with an upwardly open seat and the crosspiece is receivable complementarily in the seat. To stabilize the assembly the base is provided with at least one support foot. This foot can be displaceable relative to the base between a position extending therefrom and a position retracted thereunder. The carrier can have a mechanism connected between the case and the foot for displacing the foot automatically into its extended position on displacement of the case out of its lower position. In another system the foot telescopes between a position extending from the base and a position retracted underneath the base. This foot can also be formed as a tool-holding drawer. It can pivot about an upright axis between a position extending from the base and a position retracted underneath the base.

Formations in accordance with the invention are provided on the base and case that interengage and lock the two parts together in the lower position of the case. These formations are complementary. In addition the base is provided with a pull-out part displaceable between and extended position projecting from underneath the case and a retracted position directly underneath the case. The pull-out part is formed with one of the formations and is prevented from moving from the retracted to the extended position by interengagement of the formations in the lower position of the case. The formations extend crosswise of a movement direction of the pull-out part.

The base of the carrier according to the invention forms a horizontal support surface exposed when the case is in the upper position. More particularly the base includes a pull-out part forming a front portion of the support surface and displaceable between an extended position projecting from underneath the case and a retracted position directly beneath the case. This pull-out part is formed as a compartment having a removable and normally pivoted cover forming the front portion of the support surface. The pull-out part is formed as a drawer forming the compartment. The support surface has a rear portion fixed relative to the base and the two surface portions are generally coplanar and meet each other substantially without a gap in the extended position of the pull-out part.

In accordance with the invention a retaining flap is provided on the base extending upward from the support surface. This flap is at a rear edge of the support surface and is pivoted on the base. More particularly it is pivotal between an upright position and a down position lying on the support surface. interengaging formations on the flap and on the case automatically pivot the flap into the down position on movement of the case in to the lower position.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 5:
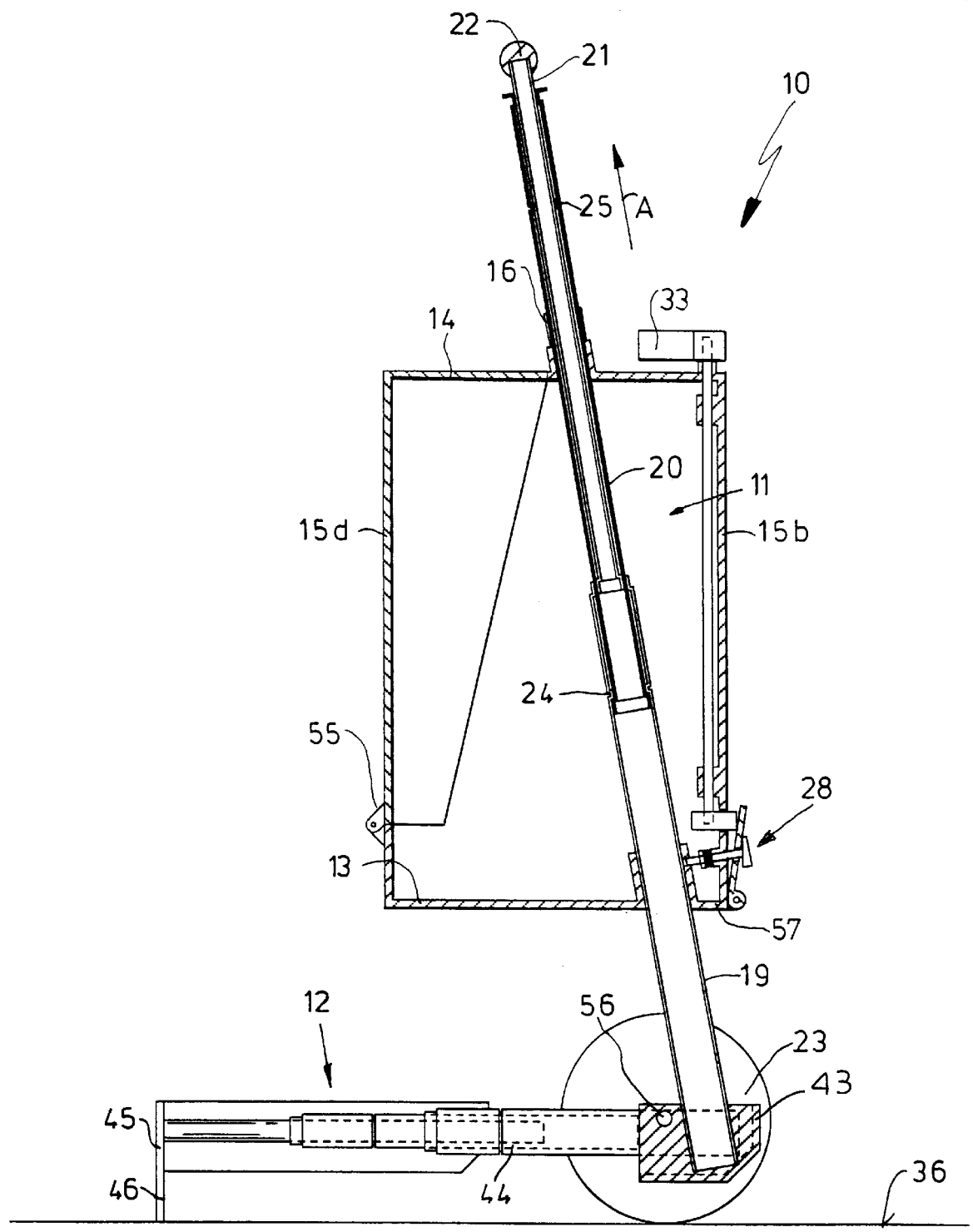
FIG. 5 is a vertical section through the case in the partially raised and extended condition.
Figure 6:
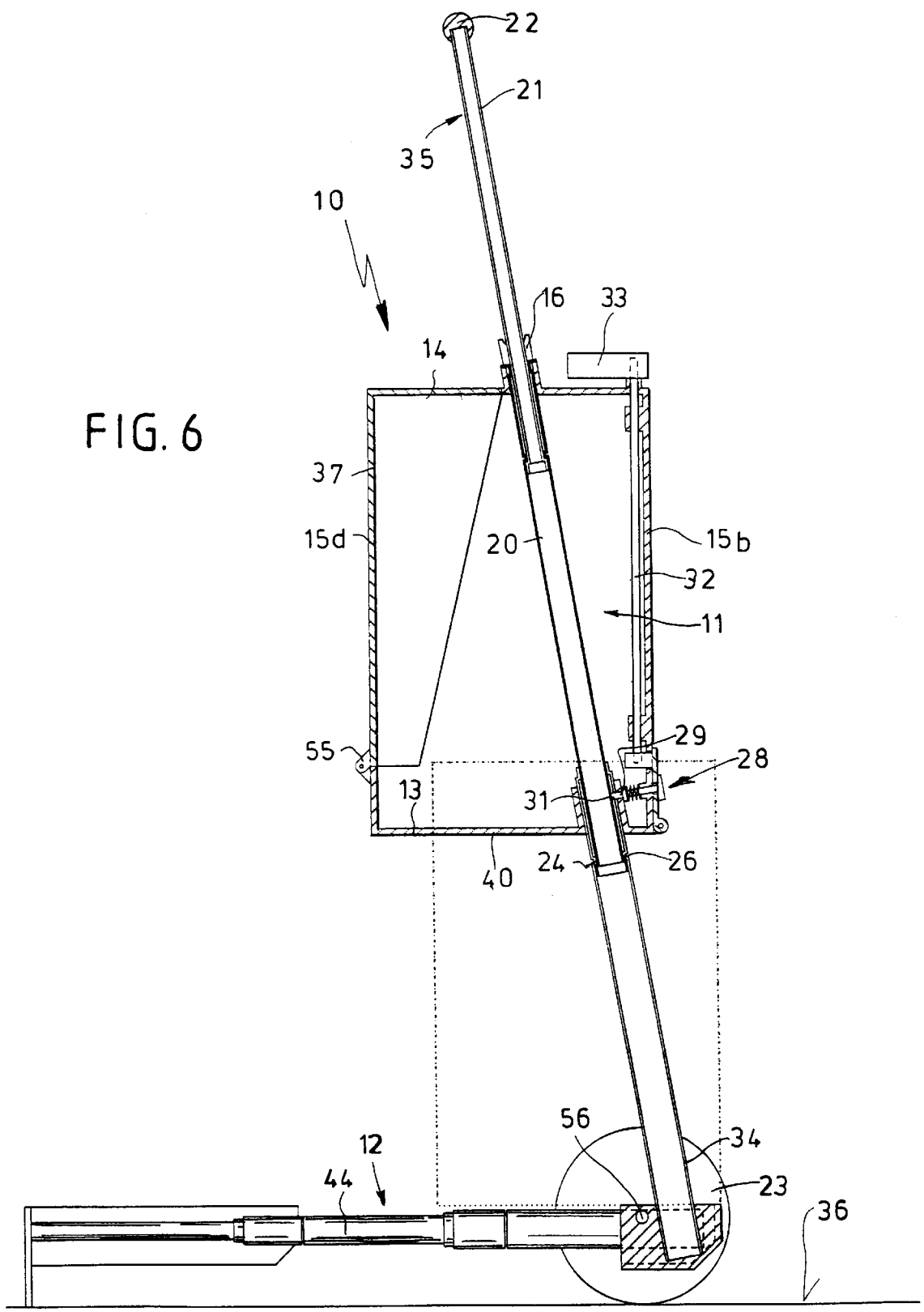
FIG. 6 is a vertical section through the case in the fully raised and extended position.
Figure 7:
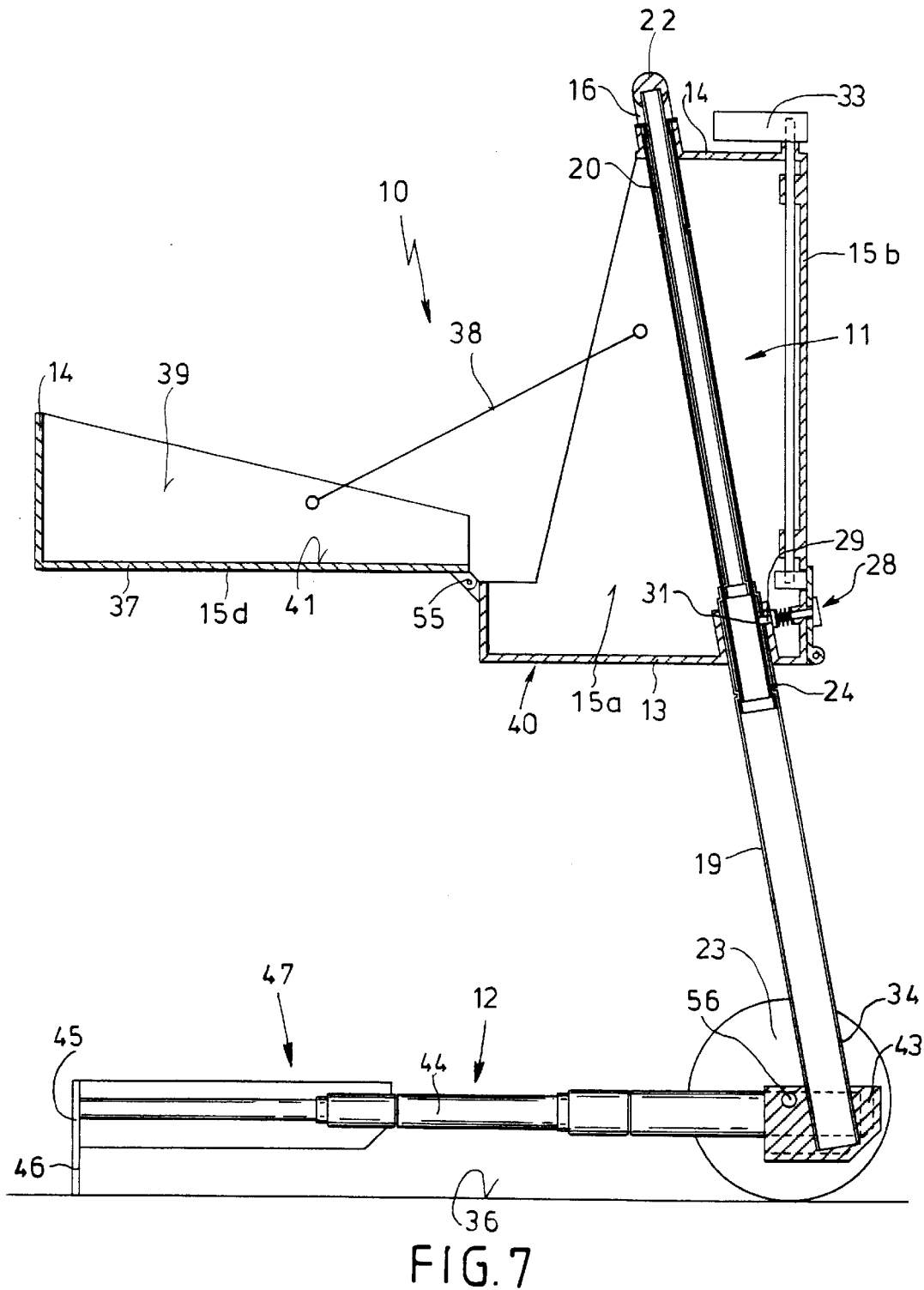
FIG. 7 is a vertical section through the case with the handle partially retracted and the case itself open.

As seen in FIGS. 1 through 8, a portable tool or instrument carrier 10 according to the invention is basically comprised of a box-like case 11 supported on a base 12. The case 11 has a lower wall or floor 13, a top or upper wall 14, and four side walls 15a, 15b, 15c, and 15d. These walls form a forwardly open body 40 and a front door-like cover or lid 37 connected together at a hinge 55 on the front wall 15d, with sides 39 of the cover 37 forming continuations of the side walls 15a and 15c. The lid 37 can be pivoted out as shown in FIG. 7 so that its inner face 41 is horizontal for use as a work area or a place to set or store tools or parts. A pair of cable lanyards 38 connected between the side walls 39 of the cover 37 and the side walls 15a and 15b of the body 40 limit pivoting of the cover 37. An axle 56 in the base member 43 carries on its ends a pair of wheels 23 permitting the carrier 10 to be rolled on a floor or ground surface 36.

The carrier 10 has a frame comprised mainly of a pair of posts 17a and 17b having lower ends seated in a horizontal frame member 43 forming part of the base 12 and upper ends interconnected by a handle-forming crosspiece 22. More specifically, each post 17a and 17b can telescope and to this end is formed of an outer or lower tube 19 fixed in the base member 43, an intermediate tube 20 slidable in the tube 19, and an upper inner tube 21 slidable in the tube 20. Outer stops 24 and 25 on the tubes 20 and 19 interact with inner stops 26 and 27 on the tubes 19 and 21 so that the posts 17a and 17b can be extended from the fully collapsed position of FIG. 2 through a partially extended position shown in FIGS. 5 and 7 to a fully extended position shown in FIGS. 4 and 6.

The upper tubes 21 and crosspiece 22 form a U-shaped frame member 35 and the crosspiece 22 has a cylindrical outer surface 53. The body part 40 has on its upper wall 14 a handle 16 with a cylindrically concave upper surface 52 forming a seat complementary to the surface 53 of the crosspiece 22 so that same can fit in it and form a convenient and very strong handle, having an opening 54 through which the fingers of a person manipulating or lifting the assembly can extend.

The lower ends of the outer tubes 19 ride in cylindrical lower guides or sleeves 58 formed in the lower wall 13 and the intermediate tubes 20 ride in cylindrical upper guides 59 in the top wall 14. In addition the tubes 19 are each formed at their lower end with a rearwardly open hole 34 and at their upper end with another rearwardly open hole 31. A pair of pins 29 of a retainer 28 are urged by springs 30 through the rear wall 15b adjacent a lower rear corner 57 of the case 11 and through the lower guide sleeves 58 so that they can fit in either of these holes 31 or 34. When engaged in the holes 34 they hold the case 11 in the lower position of FIGS. 1, 2, and 4, and when in the holes 31 they retain it in the upper position of FIGS. 6 and 7. A lever 33 on the upper wall 14 adjacent the handle 16 is effective through a linkage 32 on the two pins 29 to retract them rearward and pull them out of the holes 31 and 34, thereby freeing the case 11 to move along the extended posts 17a and 17b.

Figure 8:
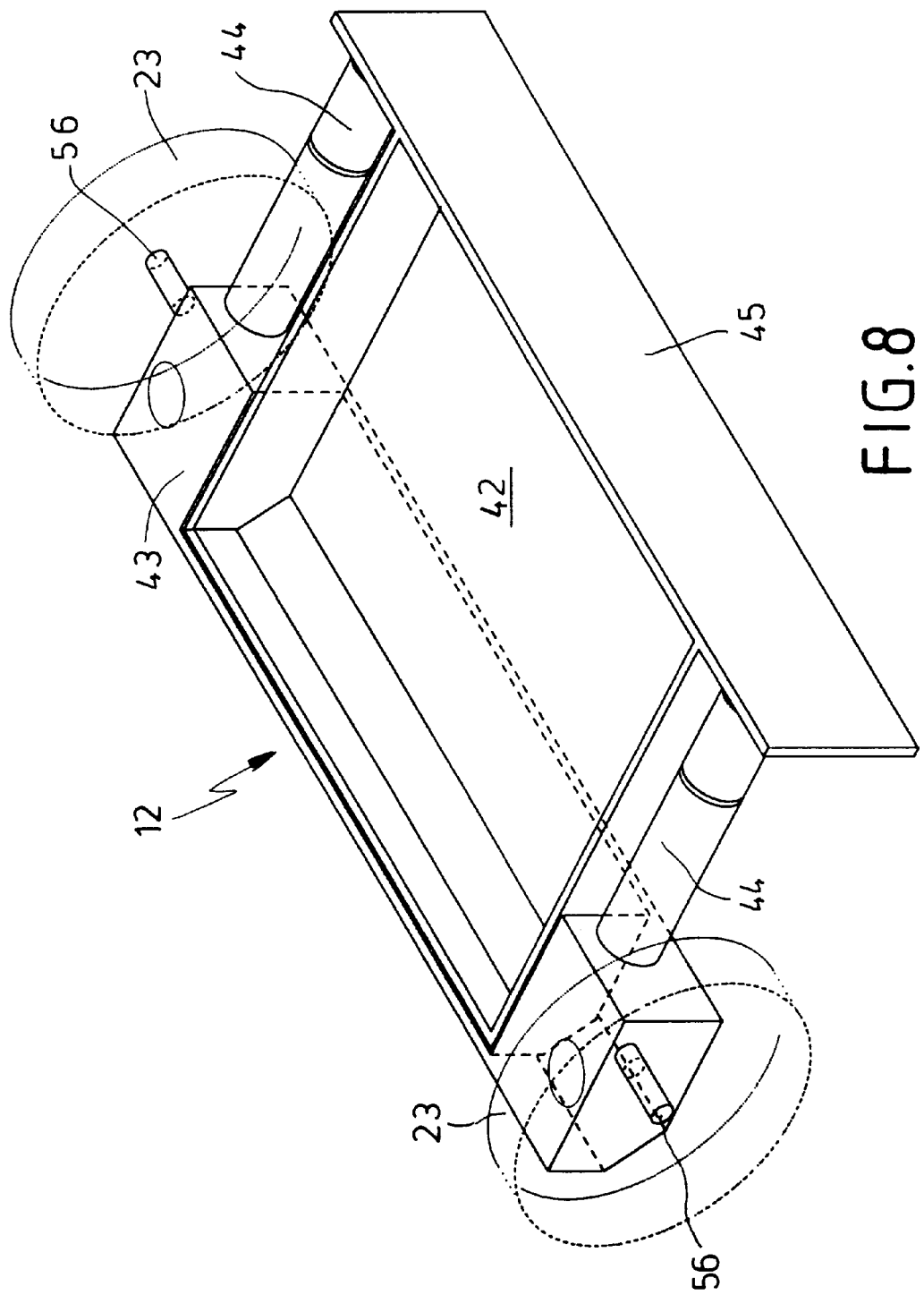
FIG. 8 is a perspective view of the drawer-type base of the case.
Figure 9:
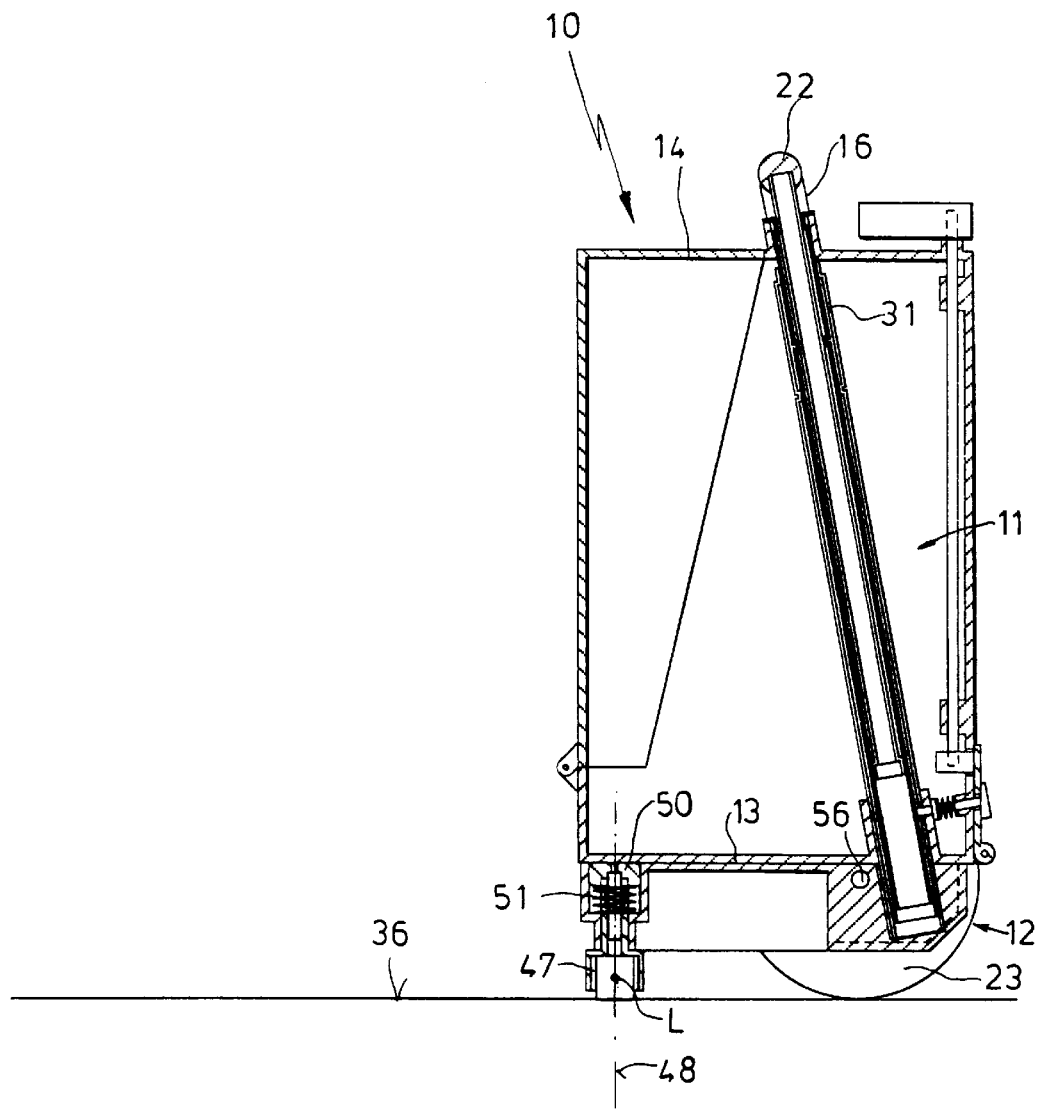
FIG. 9 is a view like FIG. 2 of another case according to the invention.
Figure 10:
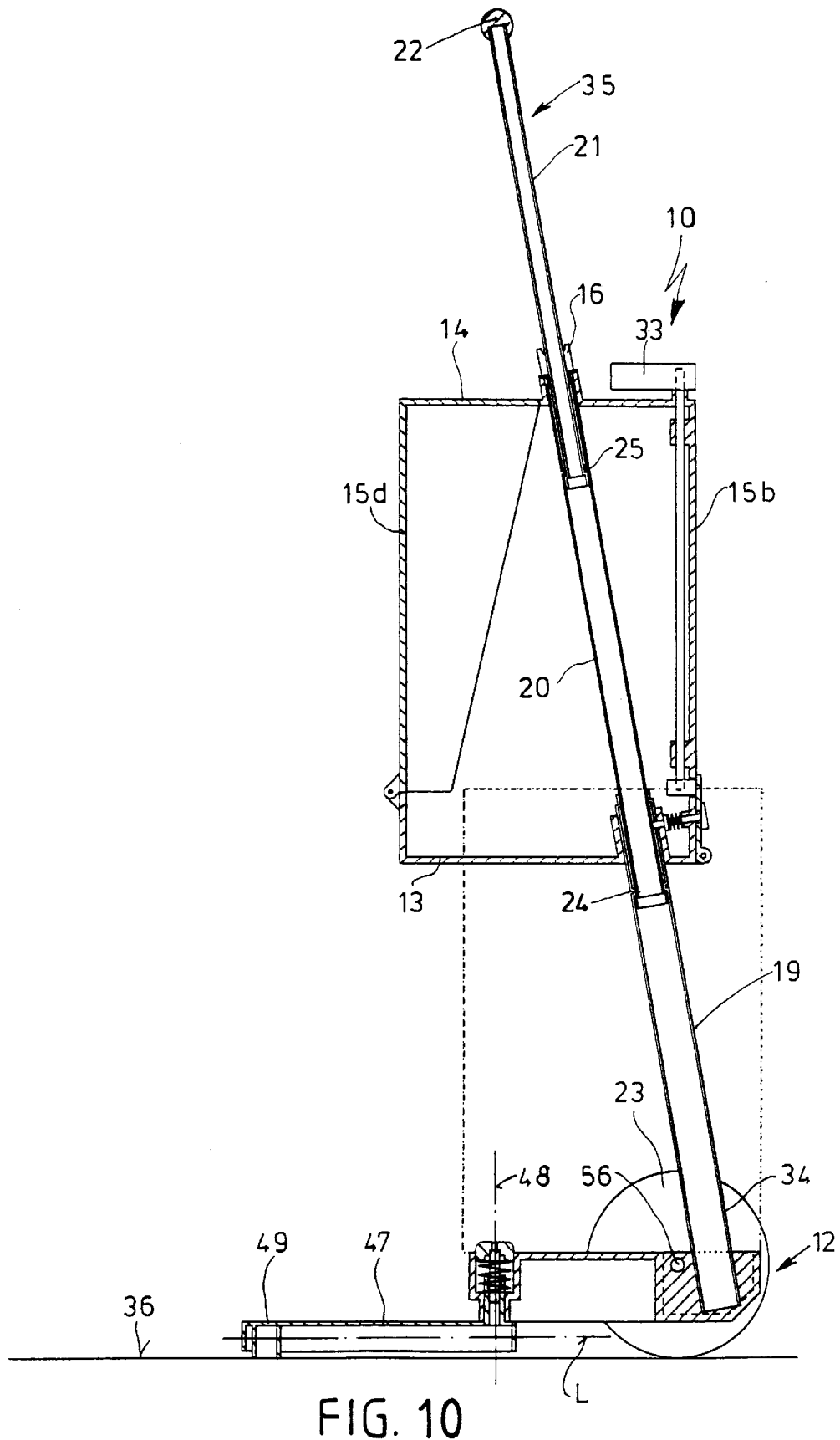
FIG. 10 is a view like FIG. 6 of the case of FIG. 9.
Figure 11:
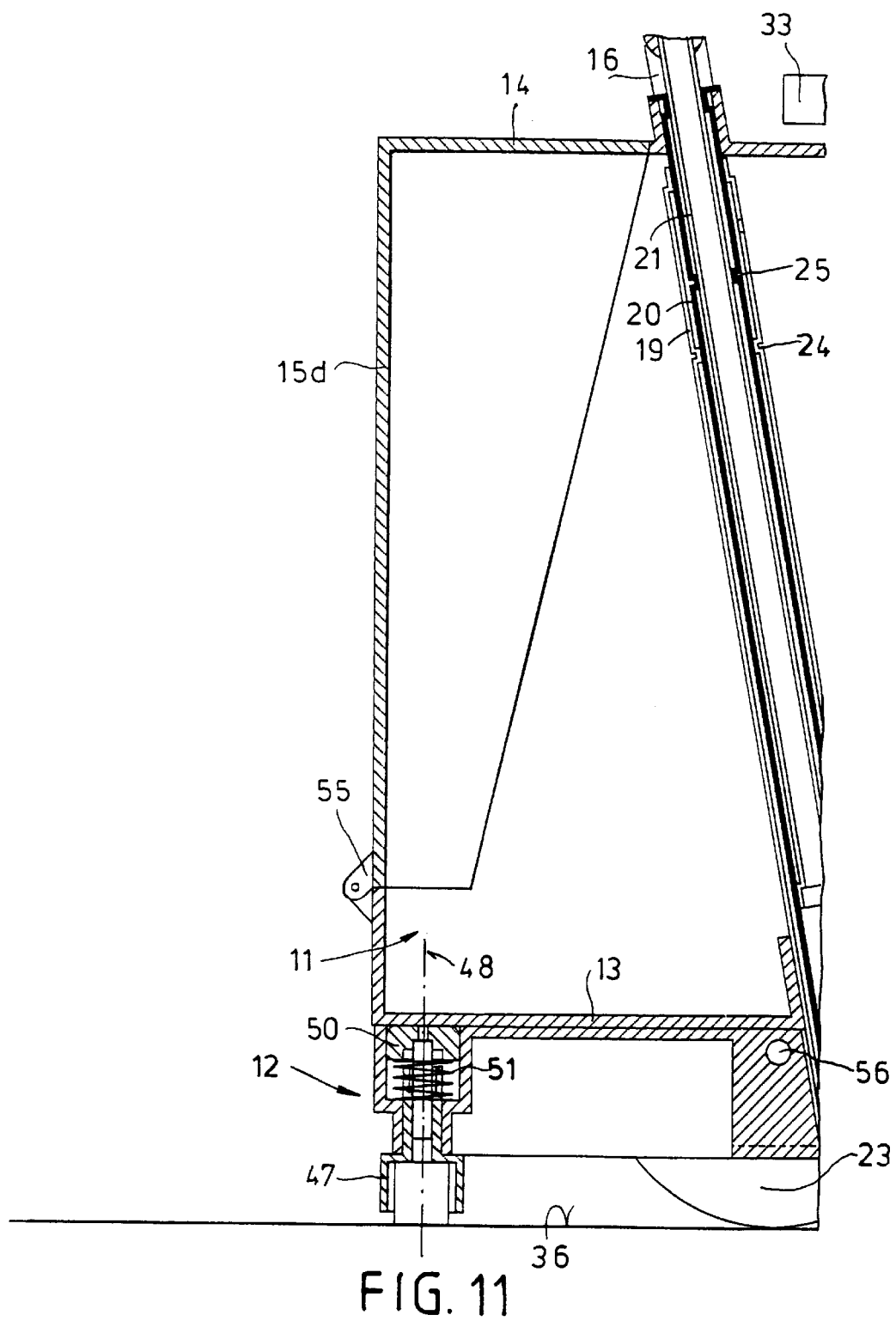
FIG. 11 is a large-scale view of a detail of FIG. 9.
Figure 12:
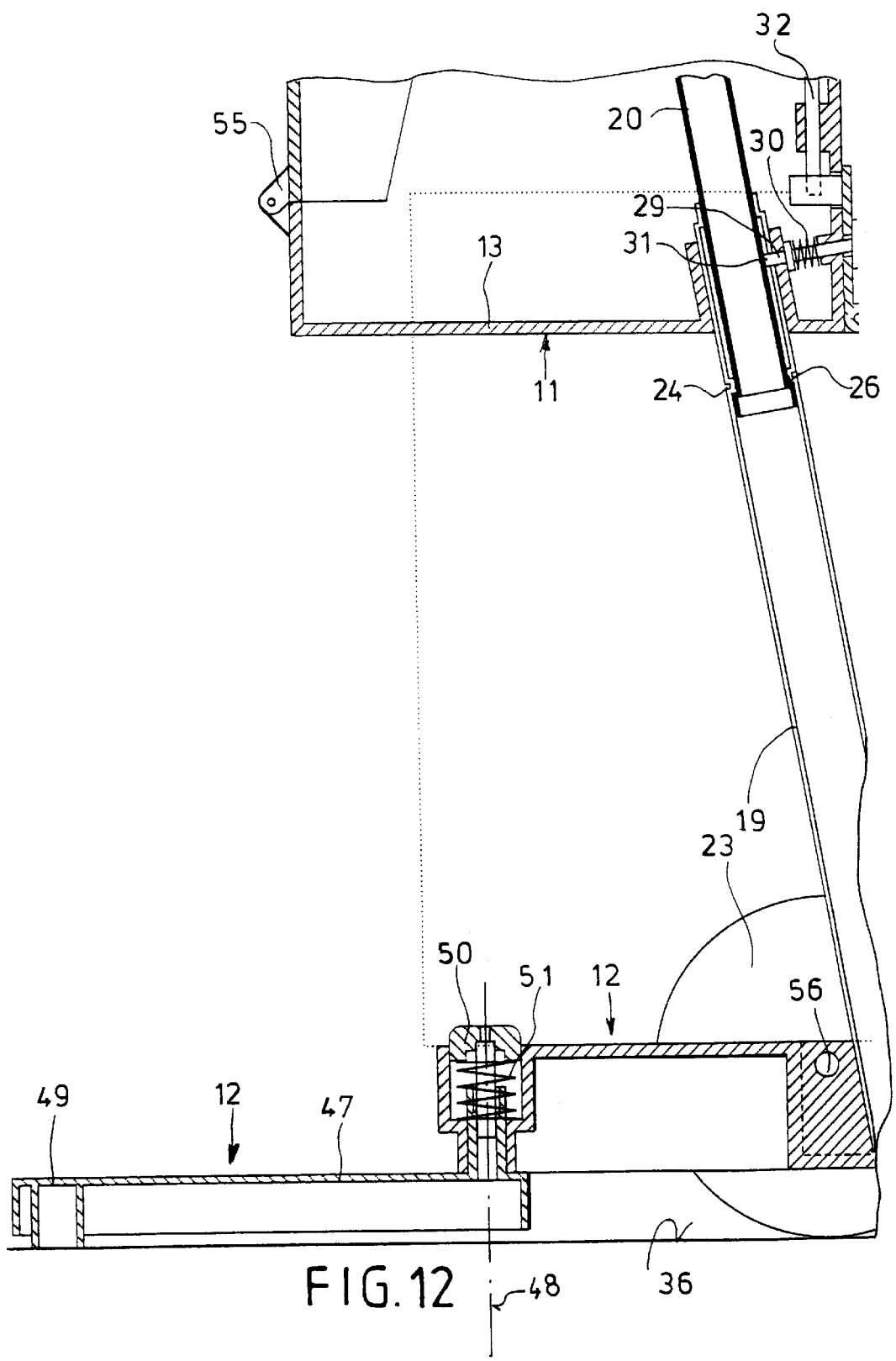
FIG. 12 is a larger-scale view of a detail of FIG. 10.
Figure 13:
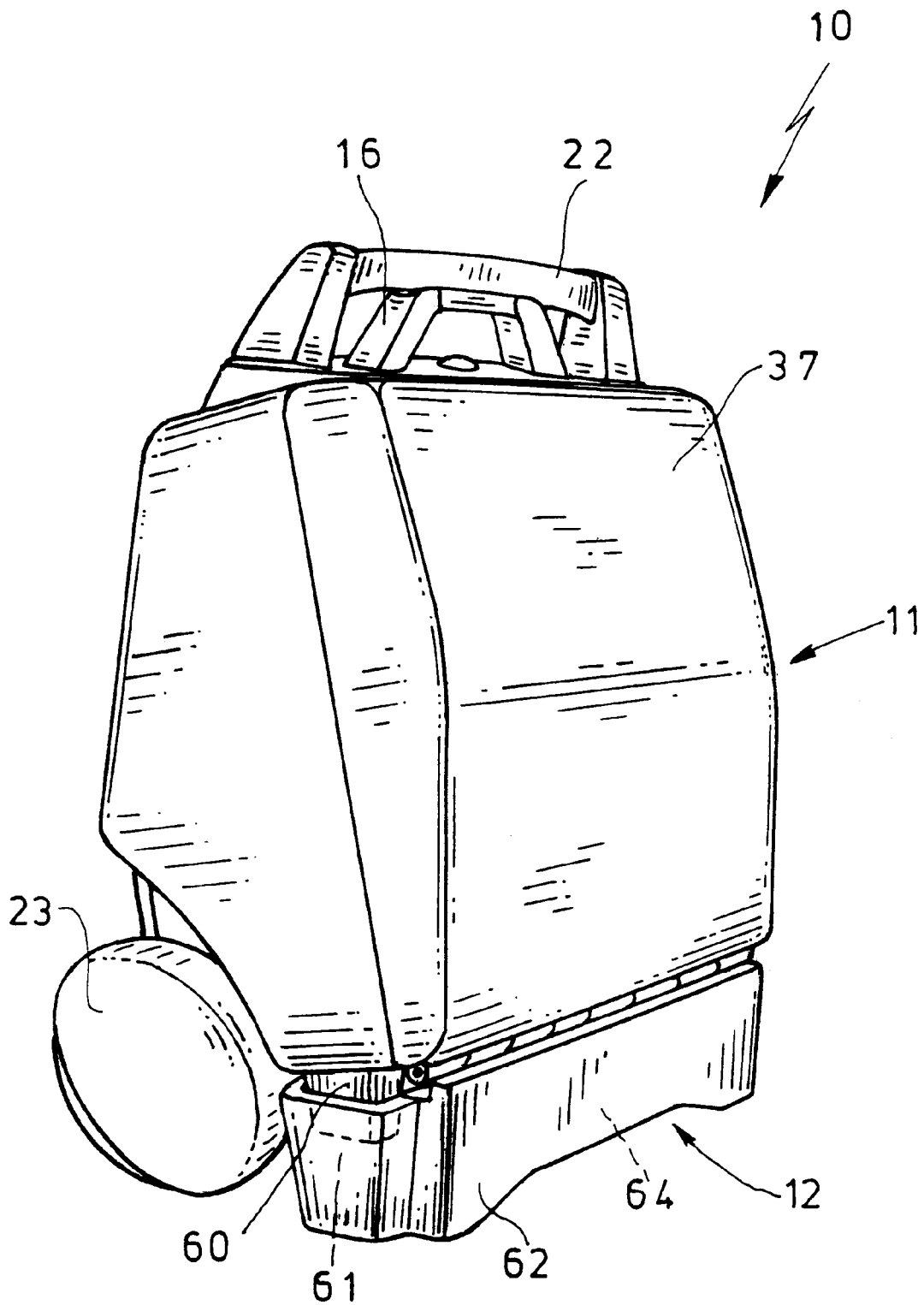
FIG. 13 is a perspective view of a third case according to the invention.
Figure 14:
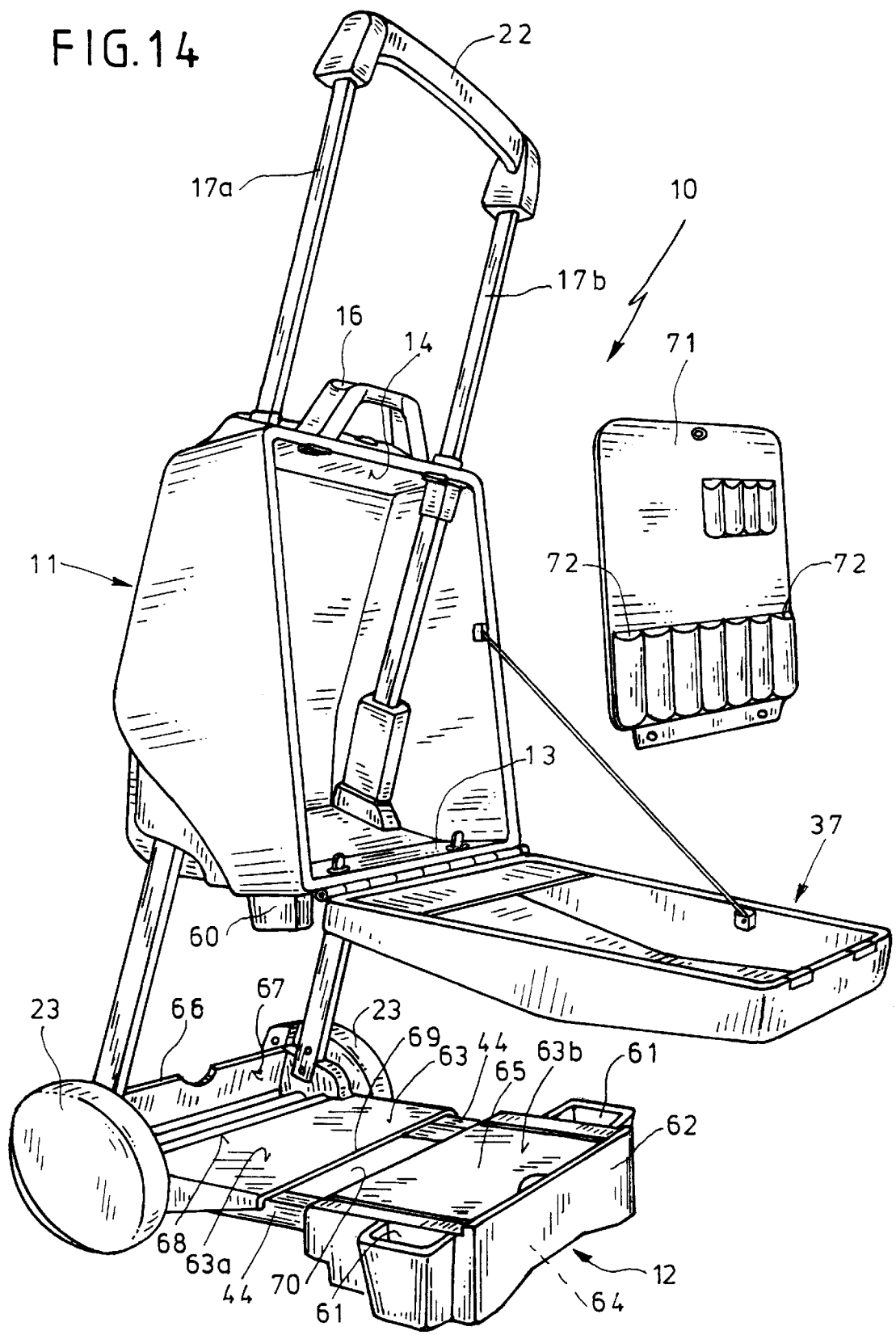
FIG. 14 is a perspective view of the case of FIG. 13 in the opened and fully raised and extended position.
Figure 15:
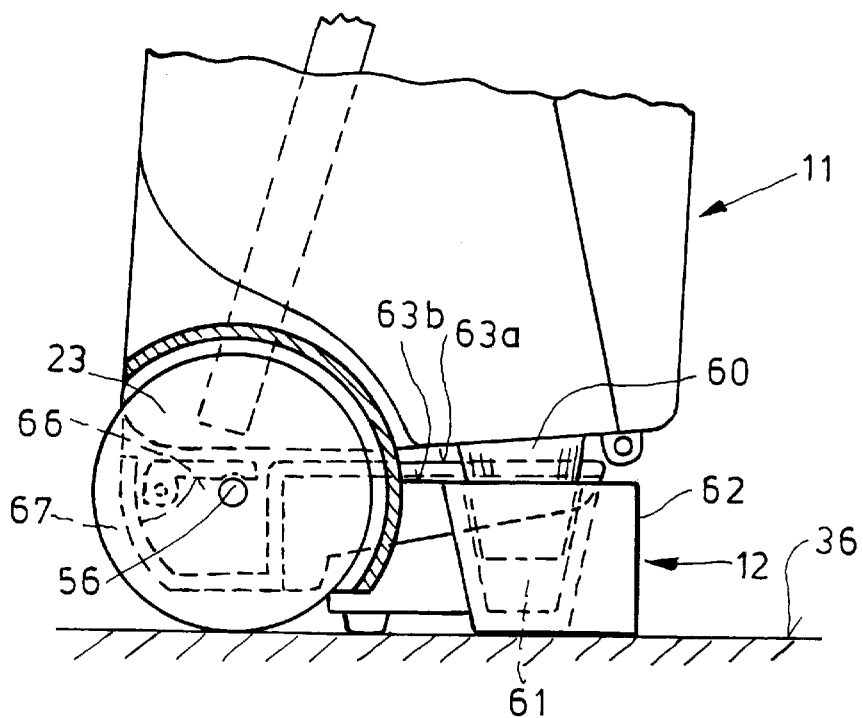
FIG. 15 is a side view of a detail of FIG. 13.
Figure 16:
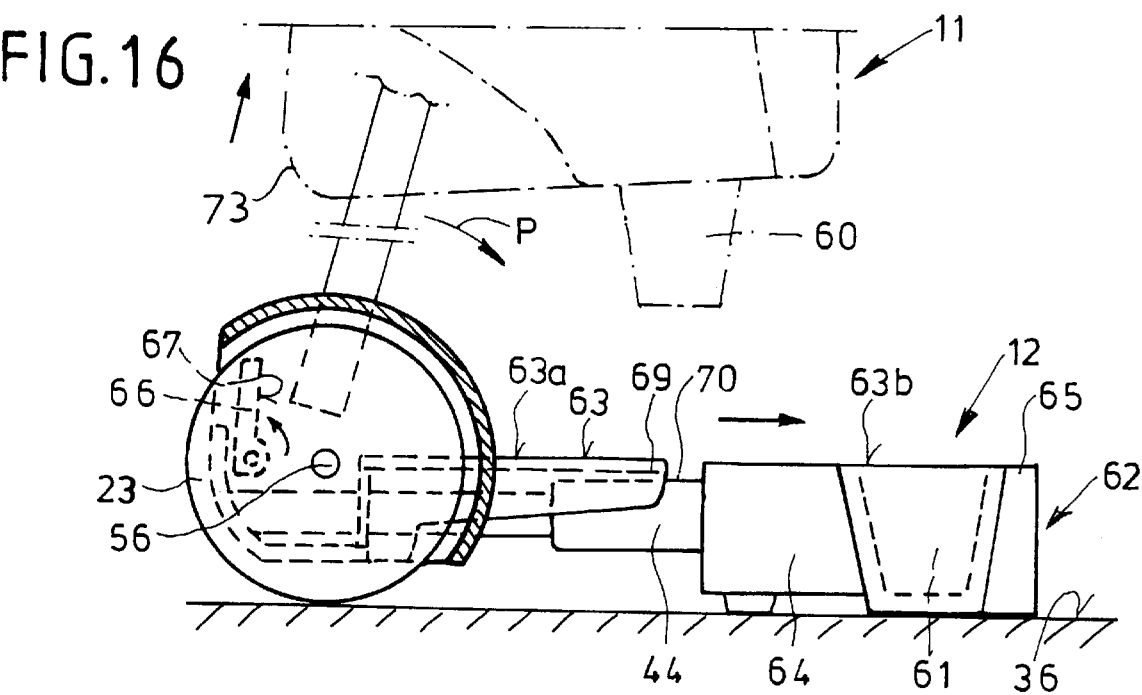
FIG. 16 is a view like FIG. 15 but showing the outrigger feet extended.

The base 12 as best shown in FIG. 8 comprises a drawer 42 which is mounted on telescoping arms 44 whose rear ends are set in the massive frame member 43. This drawer 42 has a front wall 45 with an edge 46 (FIG. 5) adapted to sit on the ground surface 36 and stabilize the carrier 10 when the drawer 42 is extended.

Figure 1:
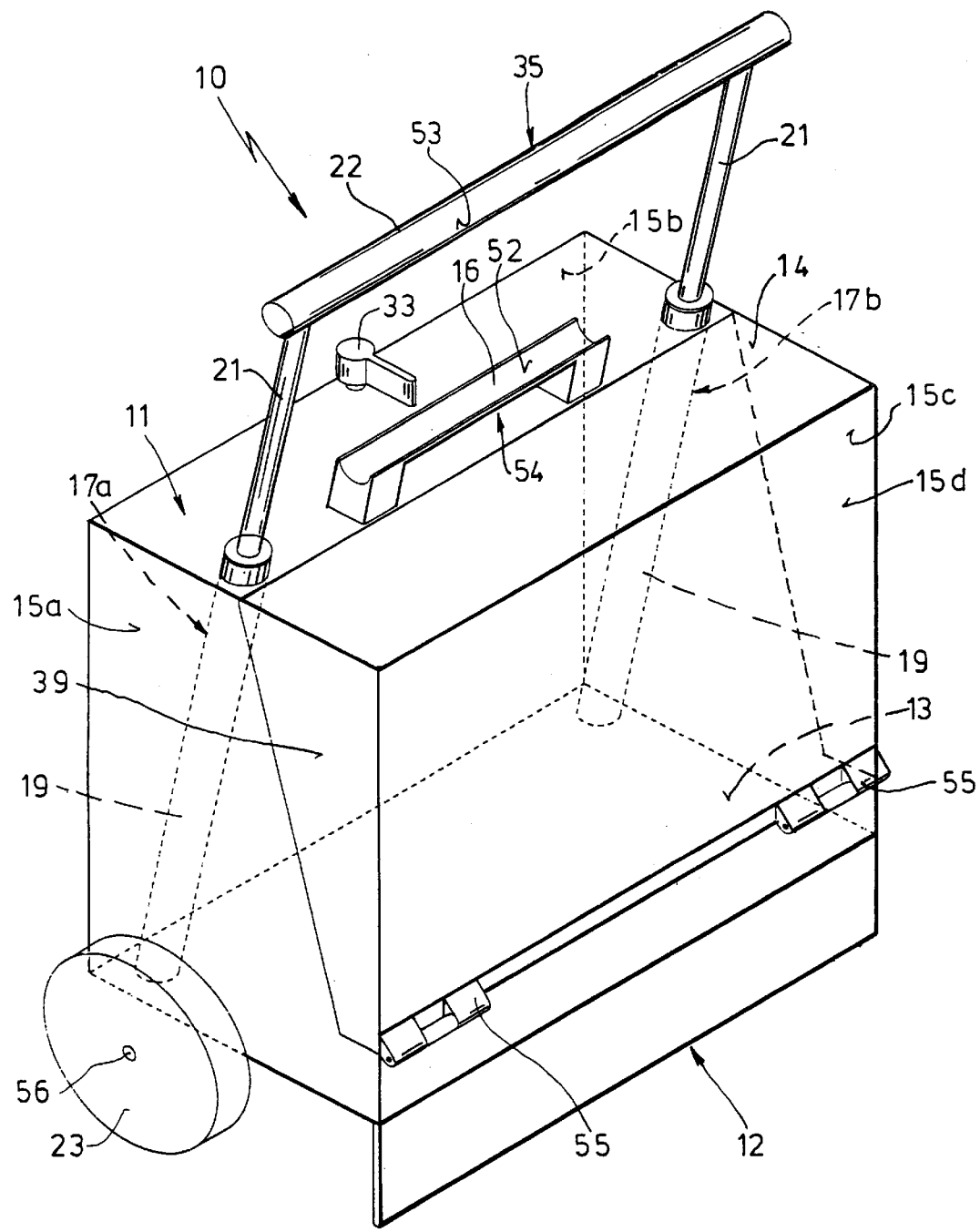
FIG. 1 is a perspective view of the portable wheeled tool case according to the invention in the partially raised travel position.
Figure 2:
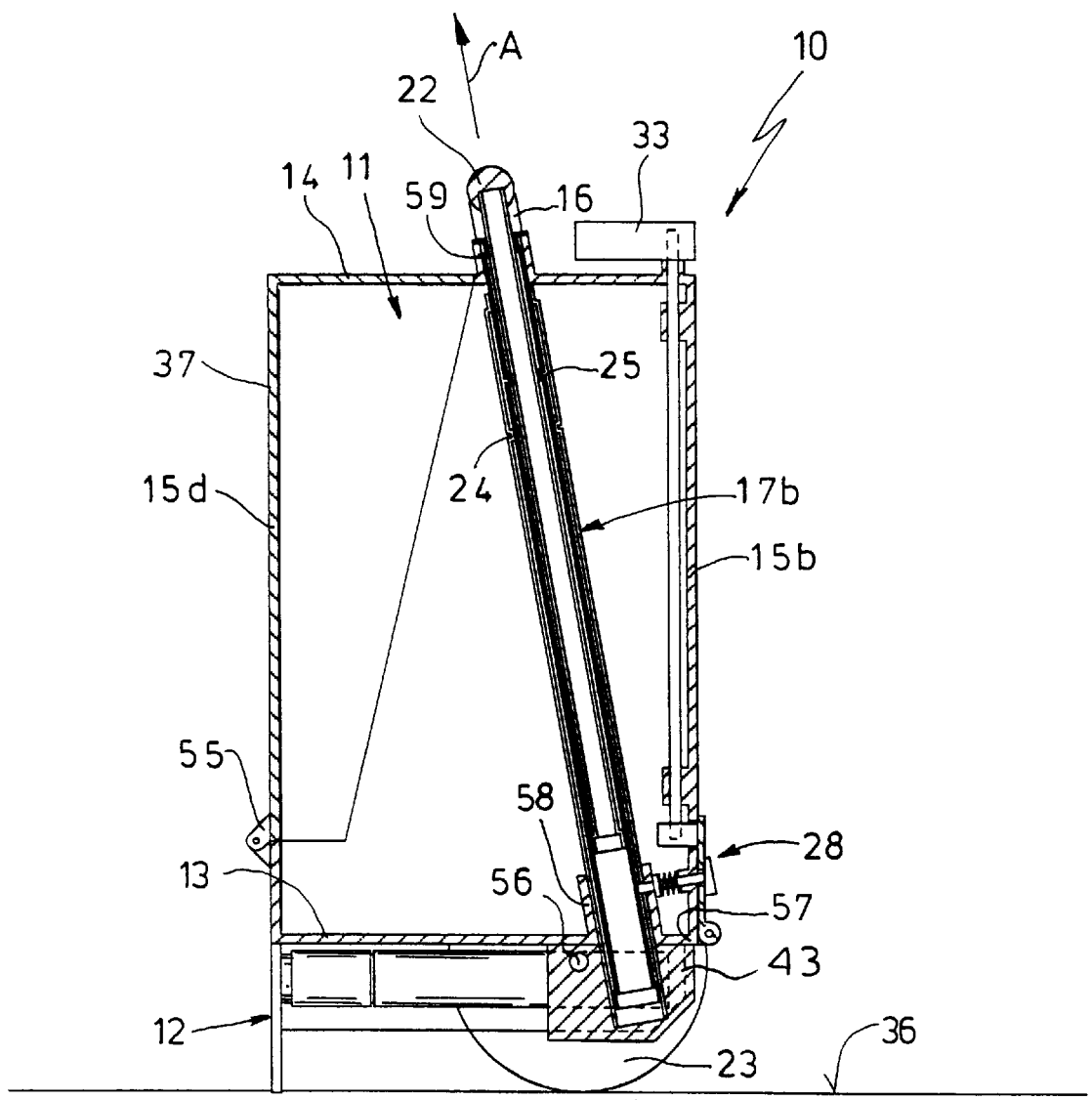
FIG. 2 is a vertical section through the case in the fully collapsed travel position.
Figure 3:
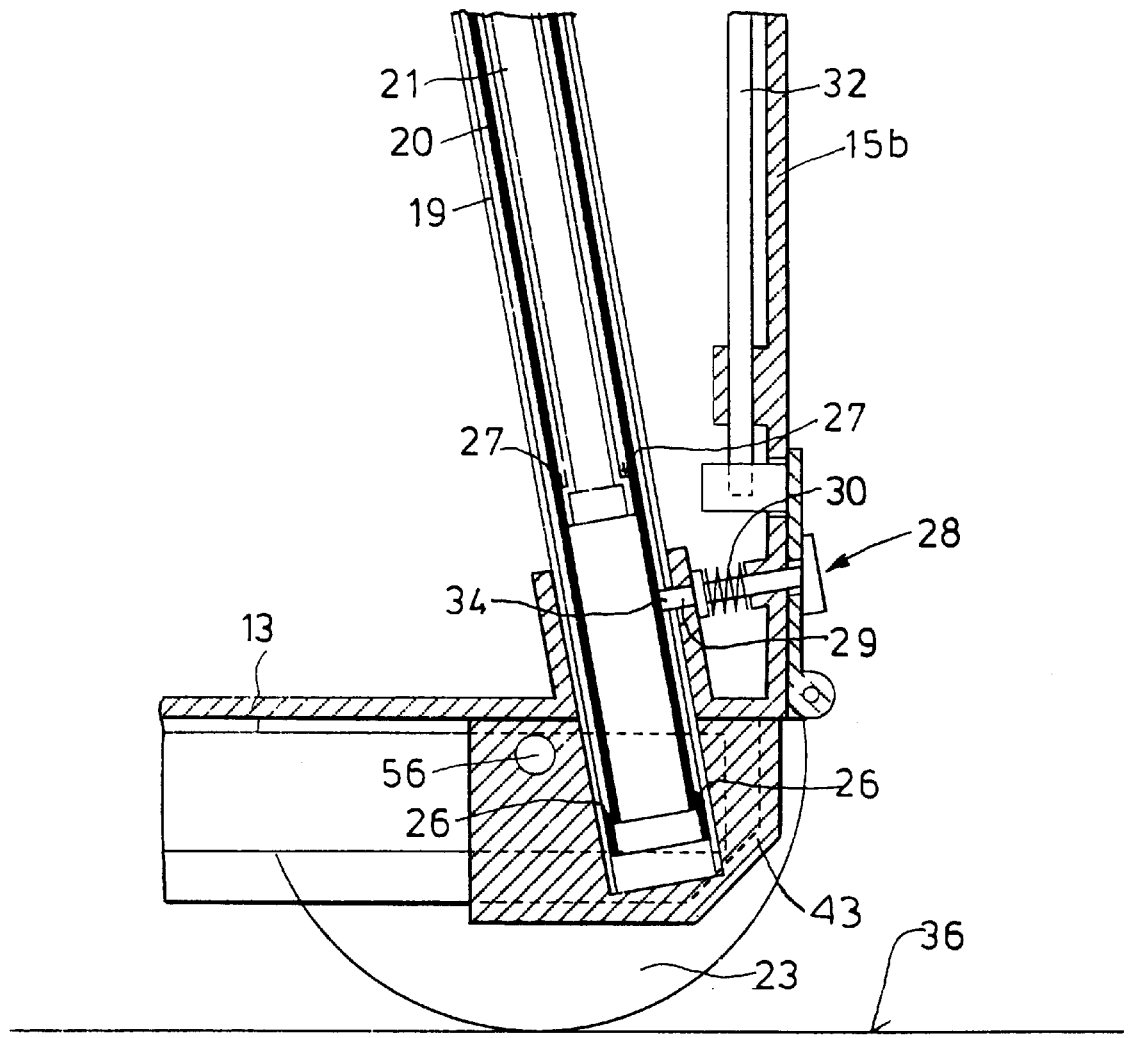
FIG. 3 is a large-scale view of a detail of FIG. 2.

Thus the carrier 10 according to the invention can be compacted to the shape shown in FIG. 2 with the posts 17a and 17b in their fully compressed position, the case 11 sitting in its lower position on the base 12, and the drawer 42 retracted. In this position the carrier 10 can basically be handled like a suitcase, although of course it can also be rolled on the wheels 23.

Figure 4:
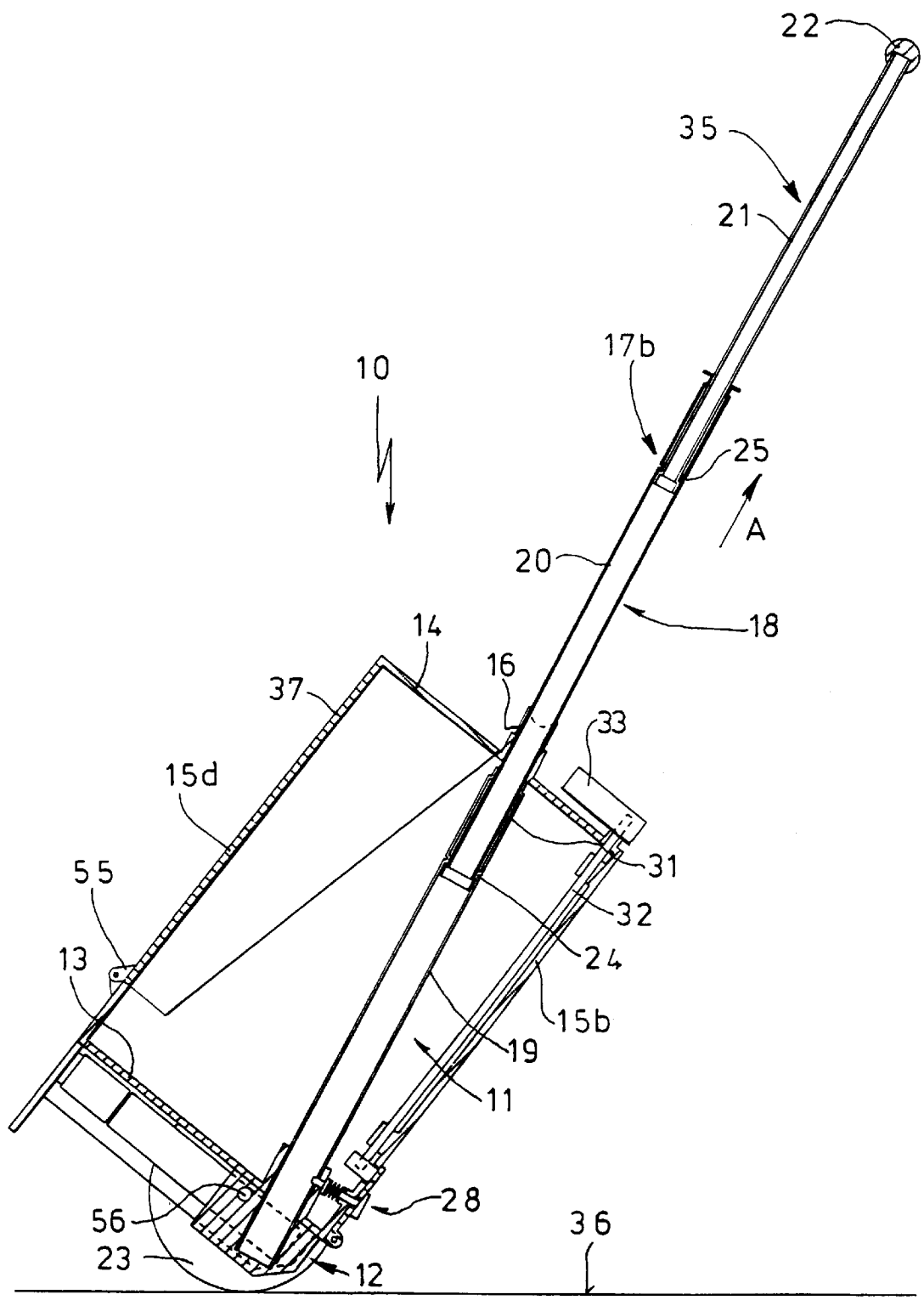
FIG. 4 is a vertical section through the case in the fully extended travel position.

If the posts 17a and 17b are extended fully in direction A as shown in FIG. 4 the case 11 can, like a hand truck, be wheeled along the ground 36 easily by tipping it back on its wheels 23 and pulling or pushing the handle 22.

Once the job site is reached, the case 11 is slid up the posts 17a and 17b through the position of FIG. 5 to the position of FIG. 6, and the drawer 42 is pulled out to stabilize the carrier and grant access to whatever is stored in the drawer 42. Then as shown in FIG. 7 the cover 37 can be flopped down, after releasing an unillustrated lock or catch, to provide access to its contents and to provide a level storage or work surface 41 at a convenient height. In addition when the case 11 is in this upper position, it is also possible to dolly it around like a hand truck without having to lower it to the position of FIG. 4.

The system of FIGS. 9 through 12 has, instead of a pull-out drawer 42 that is used to stabilize the carrier 10, a pair of elongated feet 47 pivoted about vertical axes 48 on the outer front corners of the base 12 so that outer ends 49 of these feet 47 can engage the ground 36 with longitudinal axes L of these feet 47 extending horizontally. The pivot of each foot 47 is connected via a one-flight screwthread to a plunger 50 urged upward by a spring 51. Thus as the case 1 is dropped down it will push down the plungers 50 and pivot the feet 47 into the retracted positions of FIGS. 9 and 11 underneath the base 12, while when the case 11 is lifted the springs 51 will push up the plungers 50 and automatically extend these feet 47.

In the carrier 10 of FIGS. 13 through 16 the bottom of the case 11 is provided with a pair of downwardly extending and downwardly tapering bumps or feet 60 that can engage in complementary pockets 61 of the base 12. More particularly this base 12 has a movable front part 62 and defines a surface 63 formed by a pair of panels 63a and 63b whose upper surfaces can extend coplanar with each other. A cover 65 forming the surface 63b can engage over a drawer cavity 64 used to store tools or parts and is hinged at its rear end on the base. A flap 66 pivoted about a horizontal axis at a rear edge 68 has a front face 67 that can extend horizontally or vertically. When vertical this flap 66 acts as a rear wall or stop so that anything set atop the surfaces 63a and 63b will not slide off the back. A cam edge 73 of the case 11 engages the flap 66 to push it down when in the lower position, and an unillustrated spring erects it when the case 11 is raised. During normal use the front part 62 is pulled out to leave a gap 70 between the surfaces 63a and 63b and so that the member forming the rear surface 63a can pivot down atop the telescoping arms 44, then the part 62 is pushed back against a front edge 69 of the surface 63a to close up this gap 70.

In addition the case 11 here is provided with an insert 71 that has pockets 72 in which tools or the like can be stored.

We claim:

1. A carrier for tools, the carrier comprising:

a base provided with floor engaging wheels normally adapted to sit via the wheels on a floor surface;

at least one generally vertical post extending upward from the base and including a lower tube fixed in the base and an upper tube telescoping with the lower tube between an extended position extending vertically upward from the lower tube and a collapsed position generally coextensive with the lower tube;

a hollow case adapted to hold the tools and having bottom, top, and side walls displaceable on the post in the extended position of the upper tube between a lower position sitting on the base and an upper position on the post spaced above the base; and means for retaining the case in the upper position on the post.

2. The carrier defined in claim 1 wherein the retaining means includes a spring-loaded latch that automatically secures the case in the upper position when it is slid into the upper position in the extended position of the upper tube.

3. The carrier defined in claim 1 wherein there are two such posts parallel to each other and each having a respective lower tube fixed in the base and upper tube telescoping with the lower tube.

4. The carrier defined in claim 3 wherein the top wall is provided generally centrally with a handle.

5. The carrier defined in claim 1 wherein each post projects through the lower wall and through the top wall of the case.

6. The carrier defined in claim 1 wherein the base has two such wheels.

7. The carrier defined in claim 1, further comprising a crosspiece connecting upper ends of the upper tubes.

8. The carrier defined in claim 7 wherein the crosspiece and upper tubes are movable relative to the case in the upper position thereof.

9. The carrier defined in claim 7 wherein the top wall is provided with a handle formed with an upwardly open seat and the crosspiece is receivable complementarily in the seat.

10. The carrier defined in claim 1 wherein the base is provided with at least one support foot.

11. The carrier defined in claim 10 wherein the foot telescopes between a position extending from the base and a position retracted underneath the base.

12. The carrier defined in claim 11 wherein the foot is formed as a tool-holding drawer.

13. The carrier defined in claim 10 wherein the foot pivots about an upright axis between a position extending from the base and a position retracted underneath the base.

14. The carrier defined in claim 1 wherein the post extends at least partially through the case.

15. The carrier defined in claim 1, further comprising formations on the base and case that interengage and lock the two parts together in the lower position of the case.

16. The carrier defined in claim 15 wherein the interengaging formations are complementary.

17. A carrier for tools, the carrier comprising:

a base normally adapted to sit on a floor surface and provided with a pull-out part displaceable in a movement direction between an extended position projecting from underneath the case and a retracted position directly underneath the case;

a frame extending upward from the base;

a hollow case adapted to hold the tools and having bottom, top, and side walls displaceable on the frame between a lower position sitting on the base and an upper position on the frame spaced above the base; and formations on the base and case that interengage and lock the two parts together in the lower position of the case, the pull-out part being formed with one of the formations and being prevented from moving from the retracted to the extended position by interengagement of the formations in the lower position of the case.

18. The carrier defined in claim 17 wherein the formations extend crosswise of the movement direction of the pull-out part.

19. The carrier defined in claim 1 wherein the base forms a horizontal support surface exposed when the case is in the upper position.

20. The carrier defined in claim 19 wherein the base includes a pull-out part forming a front portion of the support surface and displaceable between an extended position projecting from underneath the case and a retracted position directly beneath the case.

21. The carrier defined in claim 20 wherein the pull-out part is formed as a compartment having a removable cover forming the front portion of the support surface.

22. The carrier defined in claim 21 wherein the cover is pivoted on the pull-out part.

23. The carrier defined in claim 21 wherein the pull-out part is formed as a drawer forming the compartment.

24. The carrier defined in claim 21 wherein the support surface has a rear portion fixed relative to the base.

25. The carrier defined in claim 24 wherein the front and rear surface portions are generally coplanar.

26. The carrier defined in claim 24 wherein the front and rear surface portions meet each other substantially without a gap in the extended position of the pull-out part.

27. The carrier defined in claim 21, further comprising a retaining flap on the base extending upward from the support surface.

28. The carrier defined in claim 27 wherein the retaining flap is at a rear edge of the support surface.

29. The carrier defined in claim 27 wherein the retaining flap is pivoted on the base.

30. The carrier defined in claim 29 wherein the retaining flap is pivotal between an upright position and a down position lying on the support surface.

31. The carrier defined in claim 29, further comprising means including interengaging formations on the flap and on the case for automatically pivoting the flap into the down position on movement of the case into the lower position.

32. A carrier for tools, the carrier comprising a base normally adapted to sit on a floor surface and provided with at least one support foot displaceable relative to the base between a position extending therefrom and a position retracted thereunder a frame extending upward from the base;

a hollow case adapted to hold the tools and having bottom, top, and side walls displaceable on the frame between a lower position sitting on the base and an upper position on the frame spaced above the base; and means connected between the case and the foot for displacing the foot automatically into its extended position on displacement of the case out of its lower position.

* * * * *